United States Patent
Barois et al.

(10) Patent No.: US 11,863,424 B2
(45) Date of Patent: Jan. 2, 2024

(54) METHOD FOR SELECTING A COMMUNICATION ROUTE

(71) Applicant: SAGEMCOM ENERGY & TELECOM SAS, Rueil Malmaison (FR)

(72) Inventors: Jérôme Barois, Rueil Malmaison (FR); Ziv Roter, Rueil Malmaison (FR); Julien Barthes, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 145 days.

(21) Appl. No.: 17/358,918

(22) Filed: Jun. 25, 2021

(65) Prior Publication Data

US 2022/0006725 A1 Jan. 6, 2022

(30) Foreign Application Priority Data

Jul. 1, 2020 (FR) ...................................... 2006938

(51) Int. Cl.
*H04L 45/12* (2022.01)
*H04B 3/54* (2006.01)
(Continued)

(52) U.S. Cl.
CPC ........... *H04L 45/123* (2013.01); *H04B 3/544* (2013.01); *H04B 3/58* (2013.01); *H04L 5/0098* (2013.01);
(Continued)

(58) Field of Classification Search
CPC ... H04L 45/123; H04L 5/0098; H04L 45/122; H04L 45/12; H04B 3/544; H04B 3/58;
(Continued)

(56) References Cited

U.S. PATENT DOCUMENTS

2007/0286082 A1 * 12/2007 Hikspoors ............... H04L 45/12
370/254
2018/0132174 A1 * 5/2018 Strong .................... H04L 45/00

FOREIGN PATENT DOCUMENTS

| CN | 106656795 A * | 5/2017 | |
| EP | 2999163 A1 * | 3/2016 | ............... H04B 3/54 |
| EP | 2999163 A1 | 3/2016 | |

OTHER PUBLICATIONS

G3-PLC Alliance Germany: "Introduction of G3-PLC for non-experts" version 1.1, May 2020. (Year: 2020).*

(Continued)

*Primary Examiner* — Mohammad S Adhami
*Assistant Examiner* — Jesse P. Samluk
(74) *Attorney, Agent, or Firm* — Williams Mullen; R. Brian Drozd

(57) ABSTRACT

Selecting a communication route between a first and a second node device of a mesh electrical supply network using powerline and/or radio-frequency communications is described. A route cost is obtained for each possible communication route. A communication route of the lowest route cost is selected. For a given route, the route cost is the sum of the link costs between successive node devices on the route, the link cost between two successive node devices is a weighted sum between a maximum value from a link cost in a forward direction and a link cost in a backward direction and a ratio between a number of active routes and a maximum number of active routes. A link cost in a given direction depends on the cost of the link, in the given direction, calculated for each frequency band of frequency bands used by the two successive node devices for communicating.

9 Claims, 3 Drawing Sheets

(51) Int. Cl.
  *H04B 3/58* (2006.01)
  *H04L 5/00* (2006.01)
  *H04L 45/122* (2022.01)
  *H04W 40/02* (2009.01)
(52) U.S. Cl.
  CPC ........... *H04L 45/122* (2013.01); *H04W 40/02* (2013.01); *H04B 2203/5433* (2013.01); *H04B 2203/5479* (2013.01); *H04L 45/12* (2013.01); *Y02D 30/70* (2020.08)
(58) Field of Classification Search
  CPC .... H04B 2203/5433; H04B 2203/5479; H04B 3/54; Y02D 30/70; H04W 40/02
  See application file for complete search history.

(56) References Cited

OTHER PUBLICATIONS

C. Lavenu, ISPLC 2020 Keynote presentation (Year: 2020).*
International Telecommunication Union—Standard G.9903, "Narrowband orthogonal frequency division multiplexing power line communication transceivers for G3-PLC networks", May 2013. (Year: 2013).*
International Telecommunication Union—Standard G.9903, "Narrowband orthogonal frequency division multiplexing power line communication transceivers for G3-PLC networks", May 2017. (Year: 2017).*
6.) G3-PLC Alliance Companion Specification, "Hybrid G3-PLC & RF Profile", v0.11 (Draft) Jul. 31. 2020. (Year: 2020).*
Mar. 2021 Search Report issued in French Patent Application No. 2006938.
Nov. 16, 2021 Extended European Search Report issued in Application No. 21181350.6.
Anil Mengi G3-PLC Alliance Germany: "Narrowband OFDM PLC specifications for G3-PLC networks; C18", ITU-T Draft; Study Period 2021-2024; Study Group 15; Series C18, Inernational Telecommunication Union, Geneva, CH, vol. 18/15, Mar. 18, 2021, pp. 1-277, XP044307267, Retrieved from the Internet: URL:https://www.itu.int/ifa/t/2017/sg15/docs/rgm/Q18-210308/C/T17-SG15RGM-Q18-210308-C-0018.docx [retrieved on Mar. 8, 2021] p. 271, section "H.8.2.2 RF link cost".

* cited by examiner

METHOD FOR SELECTING A COMMUNICATION ROUTE

TECHNICAL FIELD

At least one embodiment relates to a method for selecting a communication route between a first node device and a second node device of a mesh electrical supply network using powerline communications, said second node device being able to be reached from the first node device by at least two different communication routes.

PRIOR ART

Powerline communications (PLC) are developing, in particular in the context of electrical supply networks of the AMM (Automated Meter Management) type. Communication networks are thus implemented on top of electrical supply networks for the automated collection, by a base node device (also called a "data concentrator") of the network, from smart electricity meters, of energy consumption reading data that said smart electricity meters are respectively responsible for monitoring.

Powerline communications use, for example, communication protocols such as the G3-PLC protocol ("Third Generation PLC", ITU-T G.9903). Such PLC networks using the G3-PLC protocol are so-called mesh networks making it possible to extend the range of the communications. The devices of such PLC networks are generally referred to as node devices. One node device, referred to as a coordinator device, manages the PLC network so as to organise the sharing of the same communication support: sending of synchronisation beacons, topology management, authentication, management of a temporary local addressing in the network being managed. The coordinator is for example located in a data concentrator. Node devices, generally smart electricity meters, then serve as relays on behalf of other node devices of the PLC network, i.e. other smart electricity meters, when the latter do not manage to directly receive information from the coordinator, and to directly transmit information to the data concentrator. A plurality of relays may thus be necessary to enable a node device to communicate with the coordinator. When a source node device wishes to communicate with another node device, referred to as the destination node device, e.g. with the coordinator, a communication route must be established between these two nodes. To do this, the G3-PLC protocol provides a method for seeking a communication route enabling the source node device, in collaboration with the destination node device, to determine which is the best communication route at a given instant between these two node devices. When this method is implemented, all the possible communication routes between the node device and the data concentrator device are envisaged and compared by means of a cost function defined by the G3-PLC protocol or left to the choice of a programmer. The communication route minimising the cost function is then selected for each exchange of messages between the source node device and the destination node device.

The G3-PLC standard defines a route cost in the Appendix B thereof. This route cost is particularly adapted to appliances supporting a single frequency band among the following frequency bands: the CENELEC A frequency band, which goes approximately from 35 kHz to 91 kHz; the FCC frequency band, which goes approximately from 150 kHz to 480 kHz; the ARIB frequency band, which goes approximately from 150 kHz to 400 kHz; and the CENELEC B frequency band, which goes approximately from 98 kHz to 122 kHz. These various frequency bands have different characteristics in terms of bit rate, range and resistance to interference in particular. The G3-PLC standard allows the use of only one of said frequency bands for a given node device. More exactly, the recent node devices may sometime support a plurality of frequency bands, but not at the same time. A reconfiguration is then necessary to change from a first frequency band to a second frequency band. Thus, when in a communication network it is necessary to reconfigure, in a new frequency band, a set of data concentrator devices and a set of electricity meters that are associated therewith, a reconfiguration may prove to be particularly complex. For example, a meter device that has not been able to receive a message indicating to it to change frequency band may become incapable of communicating with the data concentrator device with which it is associated, after the latter for its part has been able to change frequency band.

In a development of the G3-PLC standard, an RF (the acronym for radio frequency) channel may be used in place of one of said PLC frequency bands. In the remainder of the document, the term "frequency band" designates indifferently a PLC frequency band or an RF channel.

However, the requirements in terms of resources of the communication networks, in particular in deploying electricity supply networks of the AMM type, are increasing from day to day. The frequency band for which the elements constituting a network have been certified may find themselves at the limit of their capacity, which does not make it possible to increase the number of exchanges in the network, for example to introduce new functionalities, new application requirements, etc.

It is desirable to overcome these various drawbacks of the prior art. It is in particular desirable to propose a powerline communication method making it possible to increase the capacity of many exchanges in the network. In the case of such a communication method, the route cost defined in Appendix B of G3-PLC is not suitable.

It is therefore desirable to propose a method for determining a communication route between a source node device and a destination node device that best uses the transmission capacities between node devices of a mesh powerline communication network.

DISCLOSURE OF THE INVENTION

A method for selecting a communication route between a first node device and a second node device is described. The first and second node devices belong to a mesh powerline and/or radio-frequency communication network. The second node device can be reached from the first node device by at least two different communication routes. The method comprises:

obtaining a route cost for each of said communication routes; and selecting, from said communication routes, the communication route corresponding to the smallest route cost.

For a given route, the route cost is equal to the sum of the link costs between two successive node devices i and j on said route. The link cost between two successive node devices is equal to a weighted sum between a maximum value from a cost of the link in a forward direction and a link cost in a backward direction and a ratio between a number of active routes and a maximum number of active routes of a routing table of the node device j. A link cost in a given direction depends on the cost of the link, in said given direction, calculated for each frequency band of a set of frequency bands used by said two successive node devices i and j for communicating, said set comprising at least two different frequency bands.

The route cost proposed has the advantage of translating in a parameterisable manner the route cost gain due to a multiband approach. This is because a link cost in a given direction depends on the cost of the link, in said given direction, calculated for each frequency band.

In a particular embodiment, the frequency bands of said set of frequency bands are separate.

In a particular embodiment, said powerline link cost between two successive node devices of indices i and j is calculated as follows:

$$LC_{i,j} = \max(LC_{i \to j}, LC_{j \to i}) + adpKrt * \frac{NumberOfActiveRoutes_{PLC}}{MaximumNumberOfActiveRoutes} + adpKh$$

where adpKrt and adpKh are weighting factors:
$LC_{i \to j}$ is the link cost in the forward direction and $LC_{j \to i}$ is the link cost in the backward direction;
NumberOfActiveRoutes$_{PLC}$ is a number of active routes in the internal routing table of the node device j that use PLC communications;
MaximumNumberOfActiveRoutes is a maximum number of active routes in the internal routing table of the node device j that use powerline communications.

In a particular embodiment, said radio-frequency link cost ($LC_{i,j}$) between two successive node devices of indices i and j is calculated as follows:

$$LC_{i,j} = \max(LC_{i \to j}, LC_{j \to i}) + adpKrt_{RF} * \frac{NumberOfActiveRoutes_{RF}}{MaximumNumberOfActiveRoutes} + adpKh_{RF}$$

where adpKrt$_{RF}$ and adpKh$_{RF}$ are weighting factors weighting factors weighting factors;
$LC_{i \to j}$ is the link cost in the forward direction and $LC_{j \to i}$ is the link cost in the backward direction;
NumberOfActiveRoutes$_{RF}$ is a number of active routes in the internal routing table of the node device j that use radio-frequency communications;
MaximumNumberOfActiveRoutes is a maximum number of active routes in the internal routing table of the node device j.

In a particular embodiment, said link cost $LC_{i \to j}$ in the forward direction and respectively $LC_{j \to i}$ in the backward direction is calculated as follows $$LC_{i \to j} = adpKhr * MOD_{Khr} + \frac{Min_{LC_{i \to j}}}{1 + \sum_{m=0, m \neq m0}^{NBP-1} \left( \frac{Min_{LC_{i \to j}} * adpKmb}{LC_{i \to j}[m] * 255} \right)}$$

where $LC_{i \to j}[m]$ is said link cost in the forward direction for a frequency band of index m;
MOD$_{Khr}$ is equal to 1 for a hyper-robust mode, 0 otherwise, said hyper-robust mode being a transmission mode in which a node device transmits the same message simultaneously on a plurality of frequency bands;
NBP is a number of frequency bands used for the transmission;
Min$_{LC_{i \to j}}$=min(LC$_{i \to j}$[m]); and
adpKhr and adpKmb are weighting factors.

In a particular embodiment, the link cost $LC_{i \to j}$ in the forward direction, and respectively $LC_{j \to i}$ in the backward direction, is calculated as follows:

$$LC_{i \to j} = adpKhr * MOD_{Khr} + \frac{1}{\sum_{m=0}^{NBP-1} \left( \frac{1}{LC_{i \to j}[m]} \right)}$$

where $LC_{i \to j}[m]$ is said link cost in the forward direction for a frequency band of index m;
MOD$_{Khr}$ is equal to 1 for a hyper-robust mode, 0 otherwise, said hyper-robust mode being a transmission mode wherein a node device transmits the same message simultaneously on a plurality of frequency bands;
NBP is a number of frequency bands used for the transmission; and
adpKhr is a weighting factor.

In a particular embodiment, said link cost $LC_{i \to j}[m]$ in the forward direction, and respectively $LC_{j \to i}[m]$ in the backward direction, for a frequency band is calculated as follows:

$$LC_{i \to j}[m] = adpKr * MOD_{Kr} + adpKm * MOD_{Km} +$$
$$adpKc[m] * \frac{\left( \begin{array}{c} MaximumNumberOfTones - \\ NumberOfActiveTones \end{array} \right)}{MaximumNumberOfTones} +$$
$$adpKq * MAX\left( 0, MIN\left( 1, \frac{adpHighLQIValue - LQI}{adpHighLQIValue - adpLowLQIValue} \right) \right)$$

where MODKr=1 for a robust mode, 0 for the other modulations, a modulation according to said robust mode comprising successively a Reed-Solomon coding, a convolutional coding, a code repetition coding and a BPSK modulation;
MOD$_{Km}$ is equal to 3 for DBPSK or BPSK modulations including said robust mode, is equal to 2 for DQPSK or QPSK modulations, is equal to 1 for DBPSK or 8-PSK modulations and 0 for 16-QAM modulations;
adpKr, adpKm, adpKq are weighting factors;
adpKc[m] is a weighting factor defined per frequency band.
LQI is a value representing a quality of the link in the forward direction between the node devices i and j;
adpHighLQIValue and adpLowLQIValue are threshold values;
MaximumNumberOfTones is the number of sub-carriers available;
NumberOfActiveTones is the number of active sub-carriers.

In a particular embodiment, said link cost $LC_{i \to j}[m]$ in the forward direction, and respectively $LC_{j \to i}[m]$ in the backward direction, for a radio-frequency channel is calculated as follows:

$$LC_{i \to j}[m] = \\ adpKq_{RF} * \text{MAX}\left(0, \text{MIN}\left(1, \frac{adpHighLQIValue_{RF} - LQI_{RF}}{adpHighLQIValue_{RF} - adpLowLQIValue_{RF}}\right)\right) + \\ \frac{adpKdc_{RF} * DutyCyclePenalty}{100}$$

where:
- $adpKq_{RF}$ et $adpKdc_{RF}$ are weighting factors;
- $adpHighLQIValue_{RF}$ and $adpLowLQIValue_{RF}$ are threshold values;
- $LQI_{RF}$ is a value representing a quality of the radio-frequency link in the forward direction between the node devices i et j;
- DutyCyclePenalty is a value representing a degree of use of the radio frequency already reached with respect to a maximum authorised.

In a particular embodiment, said set of frequency bands comprises:
- the CENELEC A frequency band;
- the CENELEC B frequency band;
- the FCC frequency band or the ARIB frequency band; and
- the RF channel of G3-PLC hybrid RF.

A node device of a mesh electrical supply network using powerline and/or radio-frequency communications is described. The node device can be reached from another node device of said electrical supply network by at least two different communication routes. The node device comprises:
- means for obtaining a route cost for each of said communication routes; and
- means for selecting, from said communication routes, the communication route cost corresponding to the smallest route cost.

For a given route, the route cost is equal to the sum of the link costs between two successive node devices i and j on said route. The link cost between two successive node devices is equal to a weighted sum between a maximum value from a cost of the link in a forward direction and a link cost in a backward direction and a ratio between a number of active routes and a maximum number of active routes of a routing table of the node device j. A link cost in a given direction depends on the cost of the link, in said given direction, calculated for each frequency band of a set of frequency bands used by said two successive node devices i and j for communicating, said set comprising at least two different frequency bands.

The embodiments described with reference to the method also apply to the node device.

A mesh electrical supply network using powerline and/or radio-frequency communications comprising such a node device is also described.

A computer program product is described. It comprises instructions for implementing, by a node device, the method according to one of the preceding embodiments, when said program is executed by a processor of said node device.

A storage medium is also described. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompany drawings, among which.

DETAILED DISCLOSURE OF EMBODIMENTS

Figure 1:
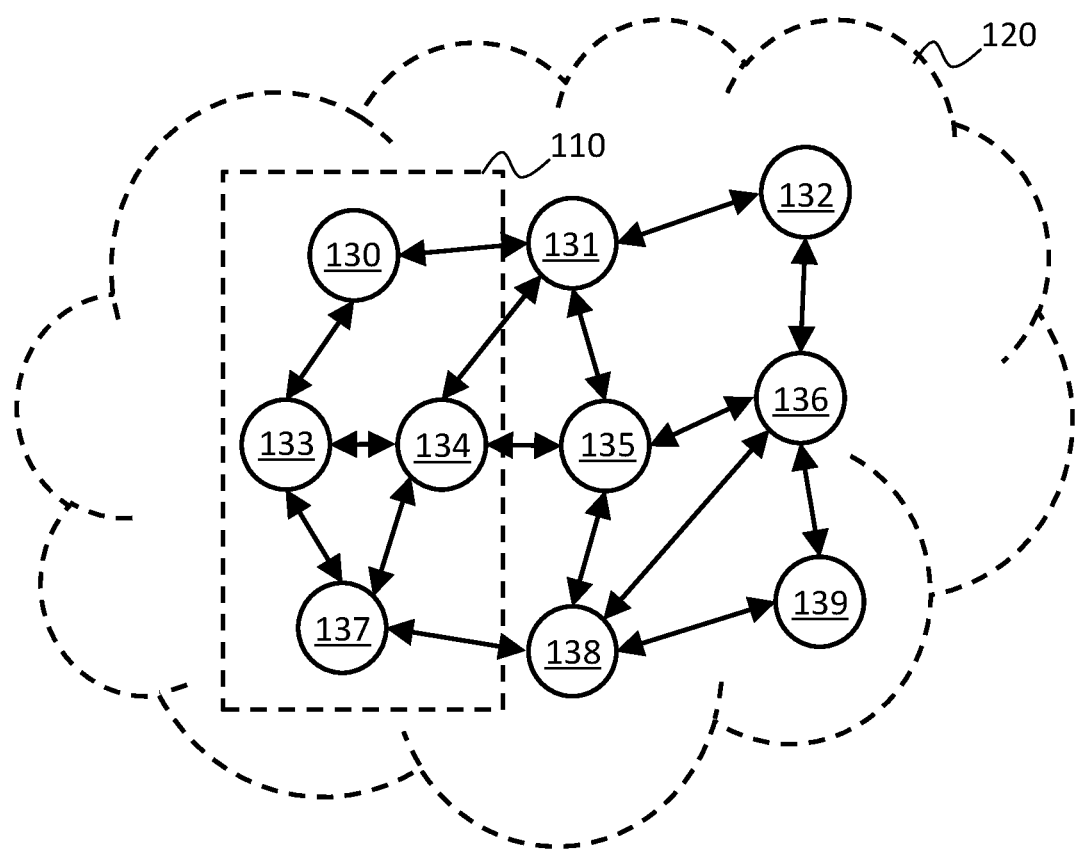
FIG. 1 illustrates schematically a mesh communication network according to one embodiment.

FIG. 1 illustrates schematically a mesh communication network 120. The mesh communication network 120 is for example an electrical supply network of the AMM type. The mesh communication network 120 relies on powerline communications PLC or radio-frequency communications to enable a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of the communications in the mesh communication network 120, as detailed hereinafter. Thus any one smart electricity meter has available potentially a plurality of paths for reaching the data concentrator, and vice-versa.

The present invention is thus particularly adapted to the context of the G3-PLC (registered trade mark) technology and its extension G3-PLC Hybrid RF.

The mesh communication network 120 thus comprises a plurality of node devices 130, 131, 132, 133, 134, 135, 136, 137, 138, 139. A network neighbourhood is associated with each node device of the mesh communication network 120. On FIG. 1, the node device 133 is associated with a network neighbourhood 110 encompassing the node devices 130, 134 and 137. In the mesh communication network 120, a signal or a message broadcast by a node device (such as the node device 133) is in general not visible at every point in the communication network. Each node device sending signals or messages then has a network neighbourhood, that is to say a subset of said mesh communication network 120 wherein every node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol-Next Generation"). Unlike the routing protocols of the proactive type that rely on a global knowledge of the network topology, the routing protocols of the reactive type rely on on-demand route discoveries, each node device of the network then needing solely to have knowledge of its own network neighbourhood for routing data in the mesh communication network 120.

To discover a suitable route in the mesh communication network 120 from a source node device (for example the node device 133) as far as a destination node device (for example the node device 132), it is known that the source node device broadcasts a route discovery request, called RREQ ("Route REQuest"). This route discovery request is received by each node device in the network neighbourhood of said source node device. Each node device in the network neighbourhood of said source node device relays said request by broadcast if said node device in question is not the destination node device. By gradual broadcasting, a plurality of route discovery requests are typically received by the destination node device, each of these requests having followed a different path in the mesh communication network 120.

Each node device that originates a message, such as for example a route discovery request, includes therein an identifier that is particular to it, as well as a sequence number, as defined in the LOADng protocol. This sequence number is a counter value particular to each node device of the mesh communication network 120. Each time a node device generates a new message, said node device increments its counter and includes the value of said counter in the message in question. Thus, when a node device receives a message, said node device analyses the identifier of the node device originating the message and the sequence number that are included in the message, and can determine whether the message received is actually a new message or a new copy of a message already received.

Each node device can however decide not to relay a route discovery request, when one or more criteria are not met. In particular, before deciding to relay said request, the node device in question typically checks whether said request comprises information representing a route cost, from the source node device as far as the node device in question, that is better than the route cost represented by information contained in another route discovery request previously received by the node device in question. In other words, the node device in question relays said request by broadcasting if said request relates to a path that has followed, from the source node device as far as the node device in question, a pathway of lower cost than any other request previously received by the node device in question (and therefore for the same route discovery).

The cost of a route may be based on one or more metrics. For example, the route cost is a number of hops experienced by the copy in question from the source node device. According to another example, the route cost is the result of a calculation that depends on the bandwidth of the links passed over, by the copy in question, from the source node device. According to yet another example, the route cost is proportional to the latency experienced by the copy in question from the source node device. Other metrics may be used to establish a route cost, i.e. a transit cost, from the source node device as far as the destination node device.

When a node device decides to relay, by broadcast, a route discovery request, the node device in question updates the route cost information contained in said request, so as to take into account the fact that said request has passed through the node device in question. Thus, according to such a principle, a plurality of copies of the route discovery request typically arrive at the destination node device, each comprising information on the cost of the route that said copy followed to be propagated from the source node device as far as the destination node device. The pathway followed by said route discovery request associated with the best route cost is then selected to enable the source node device to transmit data to the destination node device. To activate the route in question, the destination node device transmits a route discovery reply called RREP ("Route REPly"). This route discovery reply is transmitted gradually following the reverse path of the route discovery request that was associated with the best route cost. Each node device receiving the route discovery reply updates an internal routing table, at the data link layer DLL of the OSI (standing for "Open Systems Interconnection") model, in order to indicate therein that any subsequent message transmitted in unicast mode from the source node device in question to the destination node device in question must be transmitted or relayed to such and such a node device of its network neighbourhood. In the link layer, also called the MAC ("Medium Access Control") layer, the routing tables are preferentially implemented in an adaptation sublayer responsible for implementing the routing protocol in the mesh communication network. For example, this adaptation sublayer is in accordance with the 6LoWPAN protocol (standing for "IPv6 over Low power Wireless Personal Area Networks), which was initially developed to support IPv6 in the context of the IEEE 802.15.4 standard and which was extended to the G3-PLC and G3-PLC Hybrid RF (registered trade mark) technology. It should be noted that the 6LoWPAN protocol is itself based on the routing protocol of the aforementioned LOADng reactive type.

By means of the routing tables thus configured, unicast communications can be made by any pair of node devices of the mesh communication network 120. Intermediate node devices therefore serve as relays when the node devices of said pair are not in the network neighbourhood of each other, and the communications thus take place gradually, each node device relying on one of its own neighbours to relay messages as far as their respective destinations.

To communicate between adjacent node devices (i.e. node devices that are in the network neighbourhood of each other), the messages are transmitted in the form of modulated frames. When a modulated frame is specifically addressed to an adjacent node device and is correctly demodulated by it, said adjacent node device retransmits an acknowledgement ACK to the node device that sent it said modulated frame. The acknowledgement ACK is transmitted on the same frequency band as the modulated frame with which said acknowledgement ACK is associated.

A plurality of frequency bands are defined for supporting the transmission of these modulated frames, an adapted modulation scheme being associated with each of these frequency bands. Each frame transmitted in the form of modulated signals begins with a preamble defined according to the modulation scheme according to which said signals were modulated. The preamble is adapted to make it possible to synchronise in reception on said frame, that is to say to be able to determine an actual instant of start of frame. To do this, the preamble typically comprises a plurality of successive copies of the same symbol. The actual content and the duration of the preamble are thus predefined and depend on the modulation scheme used. The preambles of a plurality of frames are identical when the same modulation scheme is applied, and different otherwise.

The modulation schemes applicable (and corresponding demodulation schemes) are preferentially multi-carrier modulation schemes (and respectively demodulation schemes) of the OFDM (Orthogonal Frequency Division Multiplex) type.

In terms of frequency bands that can be used in the context of the use of the mesh communication network 120, mention can be made of: the CENELEC A frequency band, which goes approximately from 35 kHz to 91 kHz; the FCC frequency band, which goes approximately from 150 kHz to 480 kHz; the ARIB frequency band, which goes approximately from 150 kHz to 400 kHz; and the CENELEC B frequency band, which goes approximately from 98 kHz to 122 kHz; and the RF channel of G3-PLC Hybrid RF. It is then possible to use: a first thirty-six carrier modulation scheme in the CENELEC A frequency band; a second seventy-two carrier modulation scheme in the FCC frequency band; a third fifty-four carrier modulation scheme in the ARIB frequency band; a fourth sixteen carrier modulation scheme in the CENELEC B frequency band; and a fifth modulation scheme for the RF channel of G3-PLC Hybrid RF. It is clear from the above that a node device can simultaneously use a plurality of frequency bands for communicating with one or more of its neighbours, by applying an adapted transmission mechanism. However, it is clear that the ARIB and FCC frequency bands cannot be used simultaneously by the same node device since they overlap each other.

The powerline channels and the RF channel are very hostile supports. The characteristics and parameters of the channel vary according to the frequency, the location, the time and the type of equipment connected thereto. The low-frequency regions (from 10 kHz to 200 kHz) are particularly sensitive to interference. Apart from the background noise, the channel is subject to pulsed noises and to narrow-band interference. The OFDM technology used by G3-PLC uses advanced channel-coding techniques. This combination allows very robust communication when narrow-band interference, pulsed noises and frequency-selective attenuations are present.

For this purpose, an FEC (the acronym for "forward error correction") encoder is in particular used. This FEC encoder is for example composed of a Reed-Solomon encoder and a convolutional encoder that make it possible to introduce redundancy at the bit level. They thus enable a destination node to find bits lost because of background noise and pulsed noises.

In the preferential context of the G3-PLC standard, several types of modulation are defined, including: BPSK, DBPSK, QPSK, DQPSK, 8-PSK, DBPSK, 16-QAM and a so-called robust (or ROBO) mode. In normal mode, the FEC (forward error correction) encoder is composed of a Reed-Solomon encoder and a convolutional encoder. In robust mode, the FEC (forward error correction) encoder is composed of a Reed-Solomon encoder and a convolutional encoder as in the normal mode. However, in the case of the robust mode, the convolutional encoder is followed by a repetition code. The repetition code generates 4 copies of each bit output from the convolutional encoder. Thus the system is more robust to degradations of the channel at the cost of a reduction in bit rate by 4. The data thus obtained are next passed to the input of an interleaver.

G3-PLC also defines a super-robust mode wherein the repetition code generates 6 copies of each bit output from the convolutional encoder, which increases the robustness. This mode is used only for a part of the frame control FCH (the acronym for "frame control header") of a data frame. The modulation in the robust and super-robust modes is a BPSK modulation.

Figure 2:
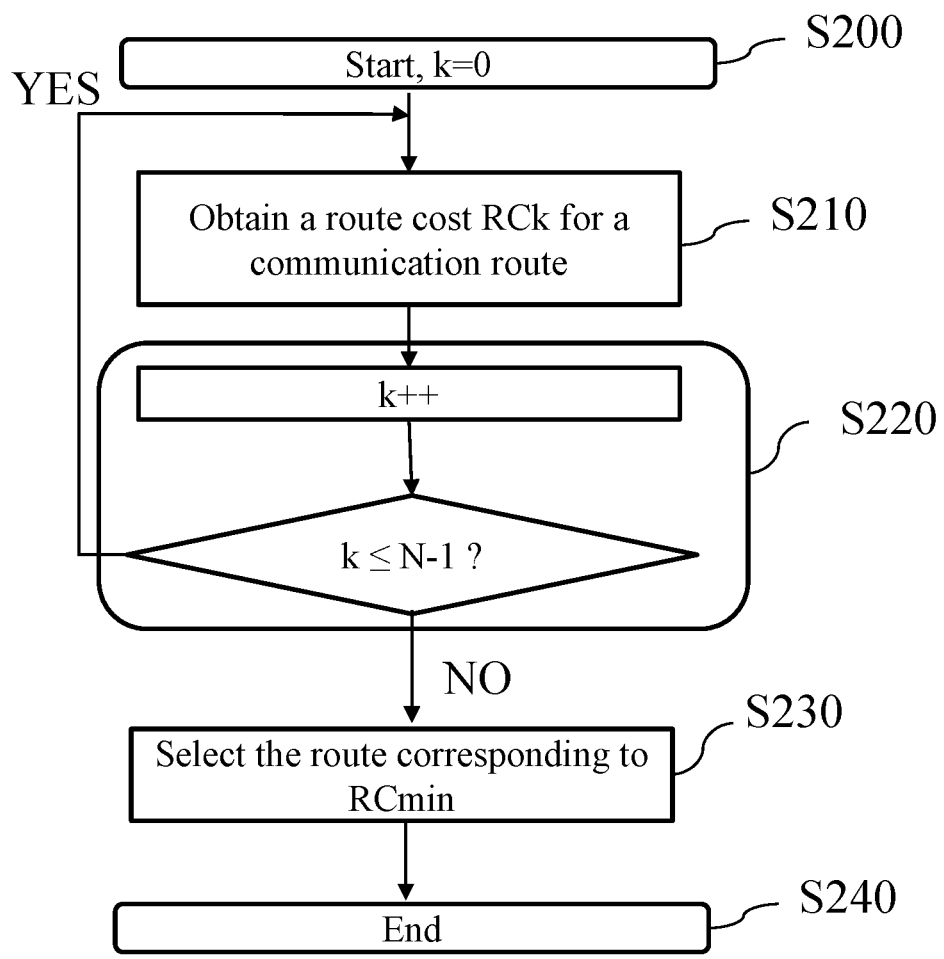
FIG. 2 illustrates schematically a method for selecting a communication route between a first node device and a second node device of a mesh electrical supply network using powerline and/or radio-frequency communications according to one embodiment.

FIG. 2 illustrates schematically a method for selecting a communication route between a first node device and a second node device of a mesh electrical supply network using powerline and/or radio-frequency communications. The second node device, e.g. the node 132, can be reached from the first node device, e.g. 133, by at least a first communication route, e.g. the route passing through the nodes 130, 131, and a second communication route, e.g. the route passing through the nodes 134, 135 and 136, different from said first communication route. In general terms, the second node device can be reached from the first node device by a plurality of N communication routes, N being a positive integer. Hereinafter, to facilitate the notations, each possible route is identified by an index k with k an integer number varying from 0 to N−1.

The method starts at a step S200 where k is equal to zero.

In a step S210, the second node device obtains a route cost $RC_k$ for a communication route of index k from the plurality of N communication routes. The route cost $RC_k$ is equal to the sum of the link costs $LC_{i,j}$ between two successive node devices i and j, i.e. situated in the same network neighbourhood. For example, in the case of the first communication route, the route cost $RC_1 = L_{133,130} + L_{130,131} + L_{131,132}$ and the cost $RC_2$ of the second communication route is equal to $L_{133,134} + L_{134,135} + L_{135,136} + L_{136,132}$.

The cost of a link $LC_{i,j}$ between two successive node devices depends on the maximum value from a cost of the link $LC_{i \to j}$ in the forward direction, i.e. from the sending node device to the receiving node device, and a link cost $LC_{j \to i}$ in the backward direction, i.e. from the receiving node device to the sending node device.

Thus, in a particular embodiment, the link cost $LC_{i,j}$ between a node device i and a node device j belonging to the network neighbourhood thereof is equal to a weighted sum between a maximum value from a link cost in a forward direction $LC_{i \to j}$ and a link cost in a backward direction $LC_{j \to i}$ and a ratio between a number of active routes and a maximum number of active routes. For example, the PLC link cost $LC_{i,j}$ is calculated as follows:

$$LC_{i,j} = \max(LC_{i \to j}, LC_{j \to i}) + adpKrt * \frac{NumberOfActiveRoutes_{PLC}}{MaximumNumberOfActiveRoutes} + adpKh$$

where $LC_{i \to j}$ and $LC_{j \to i}$ are the costs of the directional links (forward and backward directions, respectively) between the node device i and the node device j;

max(a,b) is a function that returns the value a if a>b and b otherwise;

NumberOfActiveRoutes$_{PLC}$ is the number of active routes in the internal routing table of the node device j that use a PLC communication, e.g. it is a case of the number of active routes for which the field MediaType defined in G3-PLC Hybrid is positioned at 0 in the respective inputs of the routing table;

MaximumNumberOfActiveRoutes is the maximum number of active routes in the internal routing table of the node device j;

adpKh is a weighting factor representing the cost of a hop; and adpKrt is a weighting factor associated with a number of active routes in the routing table of the node device j.

By way of example, adpKrt has the value 0 and adpKh has the value 4.

The RF link cost for its part is calculated from the formulae of the RF extension of the G3 standard:

$$LC_{i,j} = \max(LC_{i \to j}, LC_{j \to i}) + adpKrt_{RF} * \frac{NumberOfActiveRoutes_{RF}}{MaximumNumberOfActiveRoutes} + adpKh_{RF}$$

where $adpKrt_{RF}$ and $adpKh_{RF}$ are weighting factors;

NumberOfActiveRoutes$_{RF}$ is the number of active routes in the internal routing table of the node device that use a radio-frequency communication, e.g. it is the number of active routes from which the MediaType field defined in G3-PLC Hybrid is positioned at 1 (RF) in the respective entries of the routing table.

It should be noted that the value adpKh is added at each step S210. At the end, the second node device will be able to compare the potential routes, and to prefer one with fewer hops.

According to a particular embodiment, a particular metric is defined for determining the costs of the directional links in order to adapt to node devices that have transmission capacities of the multi-band type. A node device has multi-band capacities in the case where it is configured to be able to simultaneously use a plurality of different frequency bands, e.g. CENELAC A and FCC or FCC and the RF channel, instead of selecting a single band. In a particular embodiment, the frequency bands are more particularly separate. For example, the node device in question may fragment the message into various fragments according to the 6LoWPAN protocol. The fragmentation method is more particularly described in section 5.3 of the RFC recommendation 4944 (published in September 2007). Each fragment is then sent independently of the other fragments on frequency bands that may be different. The associated frequency bands are for example selected from all the frequency bands authorised by G3-PLC and the extension thereof G3-PLC Hybrid RF, i.e. CENELEC A, CENELEC B, ARIB, FCC and the RF channel. In a variant, the first and second associated frequency bands are selected from a subset of frequency bands authorised by G3-PLC and G3-PLC Hybrid RF, the subset comprising at least two bands from all the bands authorised by G3-PLC and G3-PLC Hybrid RF.

In another embodiment, a node device having multi-band capacities may transmit the same message simultaneously in all the frequency bands of the set of frequency bands adopted (by the sender and the receiver). This transmission mode is hereinafter referred to as the hyper-robust mode. In each frequency band, the robust mode of G3-PLC is then used. In this way, in the case of great frequency interference on a frequency band, the message may despite everything manage to pass over another frequency band. This is because the receiver needs to succeed in capturing the message only on one of the frequency bands on which it was sent. The hyper-robust mode is a particular mode newly defined for the case of a node device having multi-band capacities.

In another embodiment, a node device having multi-band capacities can transmit a message on all the frequency bands, which then constitute a so-called extended frequency band.

In all these embodiments, the multi-band capacity of a node device is characterised by the fact that the node is capable of using a plurality of frequency bands simultaneously instead of a single band as is the case conventionally in the case of the G3-PLC standard. A device having multi-band capacities can benefit from the characteristics of the various frequency bands in terms of bit rate, range and resistance to interference.

The route cost as defined by G3-PLC in Appendix D thereof does not make it possible to take account of these multi-band capacities of a node device. This is because the G3-PLC communication standard allows the use of only one frequency band for a given network. According to a particular embodiment, the cost of the link $LC_{i \to j}$ in a given direction, i.e. in the forward or backward direction, depends on the cost of the link, in said given direction, calculated for each frequency band $LC_{i \to j}[m]$ of the set of frequency bands used by said two successive node devices i and j for communicating, said set comprising at least two different frequency bands.

In a particular embodiment, the frequency bands of said set of frequency bands are more particularly separate.

Figure 3:
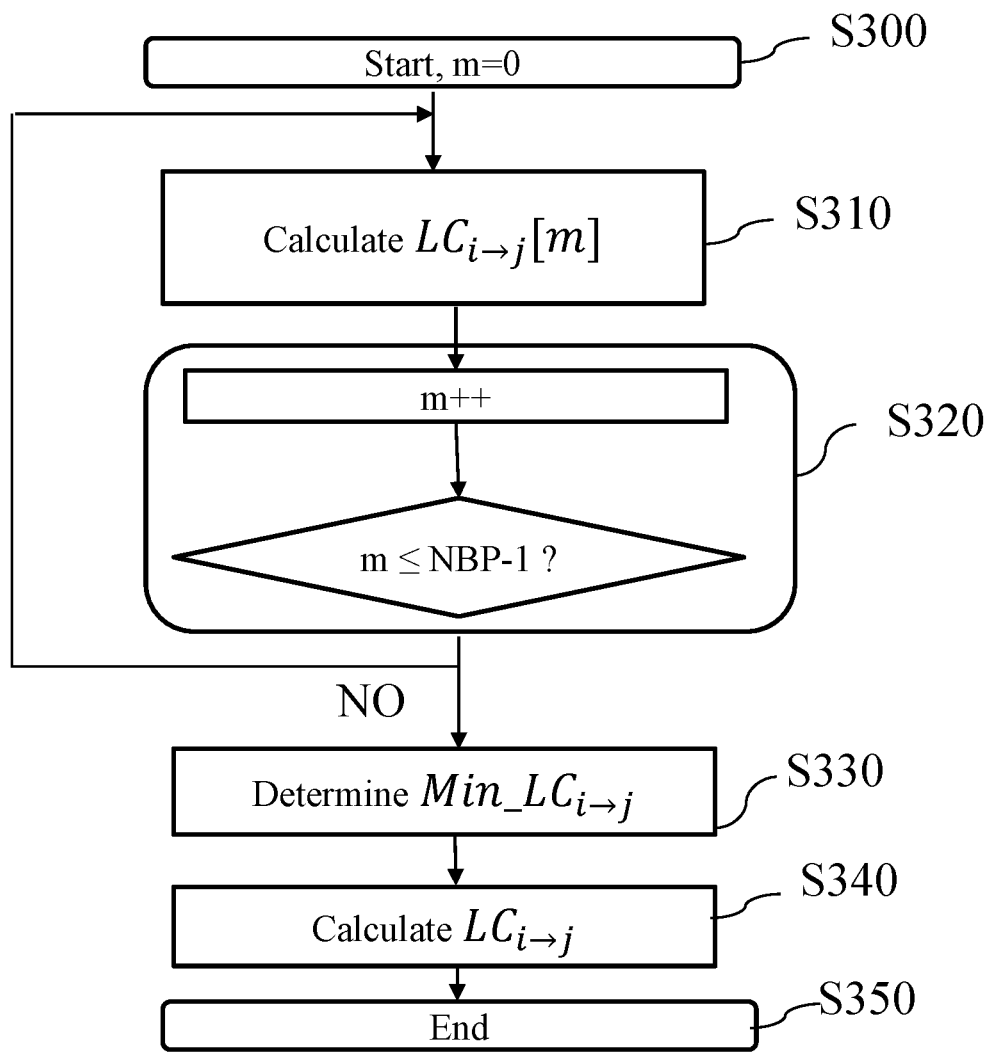
FIG. 3 illustrates schematically a method for calculating a cost $LC\_(i \to j)$ of a directional link between a first node device and a second node device of a mesh electrical supply network using powerline and/or radio-frequency communications according to a particular embodiment.

FIG. 3 illustrates schematically a method for calculating a cost $LC_{i \to j}$ of a directional link between a first node device and a second node device of a mesh electrical supply network using powerline and/or radio-frequency communications. In this embodiment, the cost $LC_{i \to j}$ of a directional link is calculated from a directional-link cost $LC_{i \to j}[m]$ per frequency band ("bandplan" for the PLC, or RF channel), m being an index identifying the frequency band, m is an integer variant from 0 to NBP−1 where NBP is an integer equal to the number of frequency bands, e.g. NBP=5. For example, m=0 corresponds to the CENELEC-A band, m=1 corresponds to the FCC band, m=2 corresponds to the CENELEC-B, m=3 corresponds to the ARIB band and m=4 corresponds to the RF channel.

The method begins at a step S300 with m=0.

In a step S310, $LC_{i \to j}[m]$ in the PLC case is calculated as follows:

$$LC_{i \to j}[m] = adpKr * MOD_{Kr} + adpKm * MOD_{Km} + adpKc[m] * \frac{\left(MaximumNumberOfTones - NumberOfActiveTones\right)}{MaximumNumberOfTones} + adpKq * \text{MAX}\left(0, \text{MIN}\left(1, \frac{adpHighLQIValue - LQI}{adpHighLQIValue - adpLowLQIValue}\right)\right)$$

where:

$MOD_{Kr}$=1 for the robust mode, 0 for the other modulations;

$MOD_{Km}$=3 for the DBPSK or BPSK modulations (including the robust mode), 2 for the DQPSK or QPSK modulations, 1 for the DBPSK or 8-PSK modulations and 0 for the 16-QAM modulations;

adpKr, adpKm, adpKq are weighting factors the values of which are predefined;

adpKr is a weighting factor associated with the robust mode;

adpKm is a weighting factor associated with the modulation;

adpKc[m] is a weighting factor defined for each frequency band and is associated with the number of active subcarriers compared with the total number of subcarriers available. By way of illustrative example, adpKc[0]=2 and adpKc[1]=1, adpKc[0] being associated with the CENELEC-A band and adpKc[1] being associated with the FCC band. This is because the FCC band offers more subcarriers than the CENELEC-A, and it is therefore logical to have an adpKc[1] lower than the adpKc[0] in order to take it into account and thus obtain a comparable result between the various bands;

LQI (the acronym for "Link Quality Indicator") is a value representing quality of the link between the node devices i and j, the node j being the current node;

adpHighLQIValue is a value representing a threshold above which an LQI value is considered to represent a "reliable" link;

adpLowLQIValue is a value representing a threshold below which an LQI value is considered to represent an "unreliable" link';

adpKq is a weighting factor associated with the LQI;

MaximumNumberOfTones is the number of available tones/subcarriers, e.g. MaximumNumberOfTones is equal to 36 for CENELEC-A and 72 for FCC. A tone map is a list of subcarriers used for communicating in a given frequency band. These subcarriers are chosen to be subject to the least interference possible in the light of the environment; and NumberOfActiveTones is the number of active tones/subcarriers. It should be noted that the tone map indicates a number of "groups of subcarriers" that are active (by corresponding bits at 1). The number of active subcarriers is obtained by multiplying this number "groups of subcarriers" by the number of subcarriers per group, e.g. 3 in FCC and 6 in CENELEC-A.

$LC_{i \to j}[m]$ in the case of the G3-PLC Hybrid RF extension of the G3 standard is calculated as follows:

$$LC_{i \to j}[m] = adpKq_{RF} * \text{MAX}\left(0, \text{MIN}\left(1, \frac{adpHighLQIValue_{RF} - LQI_{RF}}{adpHighLQIValue_{RF} - adpLowLQIValue_{RF}}\right)\right) + \frac{adpKdc_{RF} * DutyCyclePenalty}{100}$$

where:

$adpKq_{RF}$ and $adpKdc_{RF}$ are weighting factors the values of which are predefined;

$adpHighLQIValue_{RF}$ is a value representing a threshold above which an LQI value is considered to represent a "reliable" radio-frequency link;

$adpLowLQIValue_{RF}$ is a value representing a threshold below which an LQI value is considered to represent an "unreliable" radio-frequency link;

$LQI_{RF}$ is a value representing a quality of the radio-frequency link in the forward direction between the node devices i and j;

DutyCyclePenalty is a value representing a degree of use of the radio frequency already reached with respect to an authorised maximum. It must be positioned at a configuration value denoted macDutyCycleUsage_RF for calculating a link cost in the backward direction, and at a duty cycle value of the neighbour for the forward direction. If the duty cycle information on the neighbour is not available, the value is positioned at 0. The duty cycle indicates the fraction of a period during which the neighbour is active.

It should be noted that the values of the various parameters adpX, with X=Kq, adpHighLQIValue, adpLowLQIValue, Kc[m], etc mentioned can be adjusted according to the experience on the ground and transmitted through the application layer of the equipment. Some of these values may be equal to 0.

In a step S320, m is incremented by 1 and compared with NBP−1. If m is less than or equal to NBP−1 then the method continues at the step S310, otherwise it continues at the step S330.

Once $LC_{i \to j}[m]$ is calculated for all the frequency bands, the smallest value $\text{Min\_LC}_{i \to j}$ is determined during a step S330. $\text{Min\_LC}_{i \to j}$ corresponds to $m=m_0$ i.e. $\text{Min\_LC}_{i \to j} = LC_{i \to j}[m_0]$.

In a step S240, the global directional cost $LC_{i \to j}$ is calculated.

According to a first embodiment, for each $LC_{i \to j}[m]$ different from $\text{Min}_{LC_{i \to j}}$, the contribution thereof to improving the global directional link cost (i.e. $LC_{i \to j}$) is calculated using the following formula:

$$\frac{\text{Min}_{LC_{i \to j}} * adpKmb}{LC_{i \to j}[m] * 255}.$$

The global directional cost $LC_{i \to j}$ is therefore calculated as follows:

$$LC_{i \to j} = adpKhr * MOD_{Khr} + \frac{\text{Min}_{LC_{i \to j}}}{1 + \sum_{m=0, m \neq m0}^{NBP-1} \left(\frac{\text{Min}_{LC_{i \to j}} * adpKmb}{LC_{i \to j}[m] * 255}\right)} \qquad (\text{Eq. 1})$$

where:

$MOD_{Khr}=1$ for the hyper-robust mode, 0 otherwise;

adpKhr is a weighting factor associated with the hyper-robust mode in calculating the link cost, e.g. adpKhr=4;

adpKmb is a weighting factor for the route calculation in the multi-band case, e.g. adpKmb=130.

To illustrate numerically the result of this first embodiment, let us take for example the case of an $LC_{i \to j}[0]=50$ for the CENELEC-A band and $LC_{i \to j}[1]=100$ for the FCC band (without hyper-robust mode). Taking a low weighting factor adpKmb=55, the global $LC_{i \to j}$ is then equal to 50/(1+50/100*55/255)=45 (by rounding).

Adding the FCC band, even with a high route cost, therefore makes it possible to improve the route cost compared with the CENELEC-A case alone, but moderately (taking account of the low bonus factor).

According to a second embodiment, the following formula is used instead of the formula given by (Eq. 1) for calculating the global directional cost $C_{i \to j}$:

$$LC_{i \to j} = adpKhr * MOD_{Khr} + \frac{1}{\sum_{m=0}^{NBP-1} \left( \frac{1}{LC_{i \to j}[m]} \right)} \quad (\text{Eq. 2})$$

This formula is simpler than the one of (Eq.1) but does not allow weighting by the weighting factor adpKmb. To illustrate the result of this second embodiment numerically, let us take for example the case of an $LC_{i \to j}[0]=50$ for the CENELEC-A band and $LC_{i \to j}[1]=100$ for the FCC band (without hyper-robust mode). The global $LC_{i \to j}$ is then equal to $1/(\frac{1}{50}+\frac{1}{100})=33$ (by rounding). Adding the FCC band, even with a high route cost, therefore improves the global route cost with respect to the CENELEC-A case alone.

In a particular embodiment, the hyper-robust mode is not used in the equations (1) and (2) and adpKhr has a zero value.

The method of FIG. 3 terminates at a step S350.

The steps S300 to S350 are repeated in order to calculate the global directional cost $LC_{i \to j}$ and thus to deduce therefrom the cost $LC_{i,j}$.

With reference once again to FIG. 2, in a step S220, k is incremented by 1 and compared with N−1. If k is less than or equal to N−1, then the method continues at the step S210, otherwise it continues to the step S230.

In a step S230, the second node device selects, from said N communication routes, the communication route corresponding to the lowest route cost.

The method of FIG. 2 terminates at the step S240.

The initial metric as defined in Appendix B of G3-PLC takes into account only the proportion of active subcarriers. Thus the same result is obtained for CENELEC with 18 tones (proportion of 50%) and FCC with 36 tones (also proportion of 50%). The new metric proposed for determining a route cost has the advantage of representing in a parameterisable manner the saving in route cost due to a multi-band approach. As illustrated by the various numerical examples, adding a frequency band even with a high route cost improves the global route cost compared with the case of the use of a single frequency band.

It makes it possible optionally to take account of a particular robust mode, i.e. the hyper-robust mode.

It also covers the single-band case as defined in the appendix B of the current G3-PLC standard. This is because, using identical values of adpKc[m] on all the bands, the metric gives exactly the same value.

This metric can easily be used on the existing node devices by virtue of a simple software update.

Figure 4:
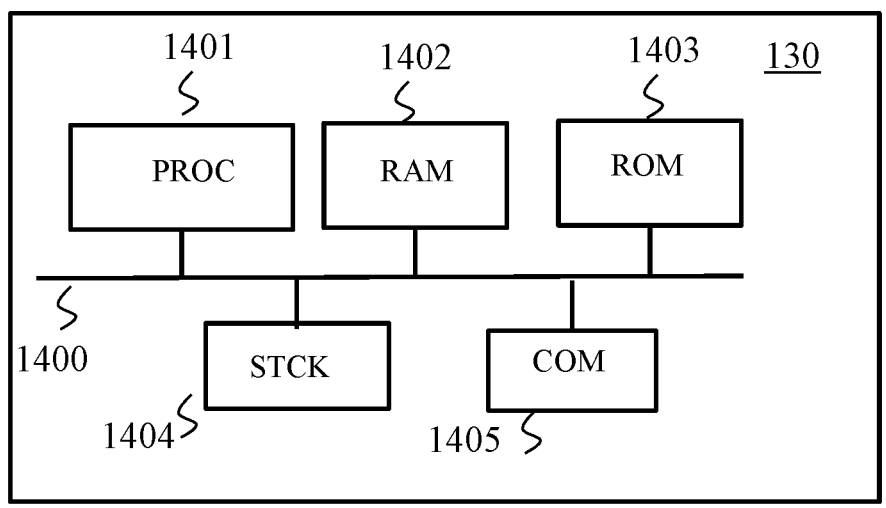
FIG. 4 illustrates schematically an example of hardware architecture of a node device of the mesh communication network according to a particular embodiment.

FIG. 4 illustrates schematically an example of hardware architecture of a node device 130 of the mesh communication network 120 according to one embodiment. It should be noted that FIG. 4 could also illustrate schematically an example of hardware architecture of a processing module including in the node device.

According to the example of hardware architecture shown in FIG. 4, the node device 130 then comprises, connected by a communication bus 1400: a processor or CPU (Central Processing Unit) 1401; a random access memory RAM 1402; a read only memory ROM 1403; a storage unit such as a hard disk (or a storage medium reader, such as an SD ("Secure Digital") card reader 1404; at least one communication interface 1405 enabling the node device 130 to communicate with the node devices belonging to its network neighbourhood, e.g. the node devices 131 and 133.

The processor 1401 is capable of executing instructions loaded in the RAM 1402 from the ROM 1403, from an external memory (not shown), from a storage medium (such as an SD card), or from a communication network. When the node device is powered up, the processor 1401 is capable of reading instructions from the RAM 1402 and executing them. These instructions form a computer program causing the implementation, by the processor 1401, of all or some of the methods described in relation to FIGS. 2 and 3.

The methods described in relation to FIGS. 2 and 3 can be implemented in software form by executing a set of instructions by a programmable machine, for example a DSP (digital signal processor) or a microcontroller, or be implemented in hardware form by a machine or a dedicated component, for example a FPGA (field-programmable gate array) or an ASIC (application-specific integrated circuit). In general, the node device 130 comprises electronic circuitry configured to implement the methods described in relation to FIGS. 2 and 3.

The invention claimed is:

1. A method for selecting a communication route between a first node device and a second node device of a mesh powerline and/or radio-frequency communication network, said second node device being able to be reached from the first node device by at least two different communication routes, said method comprising:
   obtaining a route cost for each of said communication routes; and
   selecting, from said communication routes, the communication route corresponding to a lowest route cost;
   wherein, for a given route, the route cost is equal to a sum of the link costs ($LC_{i,j}$) between two successive nodes i and j on said route, said link cost ($LC_{i,j}$) between two successive node devices is equal to a weighted sum between a maximum value from a cost of a link cost in a forward direction ($LC_{i \to j}$) and a link cost in a backward direction ($LC_{j \to i}$) and a ratio between a number of active routes and a maximum number of active routes of a routing table of the node j and wherein said link cost $LC_{i \to j}$ in the forward direction, or respectively $LC_{j \to i}$ in the backward direction, is calculated as follows $$LC_{i \to j} = adpKhr * MOD_{Khr} + \frac{\text{Min}_{LC_{i \to j}}}{1 + \sum_{m=0, m \neq m0}^{NBP-1} \left( \frac{\text{Min}_{LC_{i \to j}} * adpKmb}{Lc_{i \to j}[m] * 255} \right)}$$

or as follows:

$$LC_{i \to j} = adpKhr * MOD_{Khr} + \frac{1}{\sum_{m=0}^{NBP-1} \left( \frac{1}{LC_{i \to j}[m]} \right)}$$

where $LC_{i \to j}[m]$ is said link cost in the forward direction for a frequency band of index m;
$MOD_{Khr}$ is equal to 1 for a hyper-robust node, 0 otherwise, said hyper-robust mode being a transmission mode wherein a node device transmits a same message simultaneously on a plurality of frequency bands;

NBP is a number of frequency bands in a set of frequency bands used for the transmission, said set of frequency bands comprising at least two different frequency bands;

$\text{Min}_{LC_{i \to j}} = \min(LC_{i \to j}[m])$ and corresponds to a frequency band of index $m_0$; and adpKhr and adpKmb are weighting factors.

2. The method according to claim 1, wherein a powerline link cost ($LC_{i,j}$) between two successive node devices of indices i and j is calculated as follows:

$$LC_{i,j} = \max(LC_{i \to j}, LC_{j \to i}) + adpKrt * \frac{NumberOfActiveRoutes_{PLC}}{MaximumNumberOfActiveRoutes} + adpKh$$

where adpKrt and adpKh are weighting factors:

$LC_{i \to j}$ is the link cost in the forward direction and $LC_{j \to i}$ is the link cost in the backward direction;

NumberOfActiveRoutes$_{PLC}$ is a number of active routes in the routing table of the node device j that use powerline communications;

MaximumNumberOfActiveRoutes is a maximum number of active routes in the internal routing table of the node device j.

3. The method according to claim 1, wherein a radio-frequency link cost ($LC_{i,j}$) between two successive node devices of indices i and j is calculated as follows:

$$LC_{i,j} = \max(LC_{i \to j}, LC_{j \to i}) + adpKrt_{RF} * \frac{NumberOfActiveRoutes_{RF}}{MaximumNumberOfActiveRoutes} + adpKh_{RF}$$

where adpKrt$_{RF}$ and adpKh$_{RF}$ are weighting factors;

$LC_{i \to j}$ is the link cost in the forward direction and is the link cost in the backward direction;

NumberOfActiveRoutes$_{RF}$ is a number of active routes in the routing table of the node device j that use radio-frequency communications;

MaximumNumberOfActiveRoutes is a maximum number of active routes in the internal routing table of the node device j.

4. The method according to claim 1, wherein said link cost $LC_{i \to j}[m]$ in the forward direction, and respectively $LC_{j \to i}[m]$ in the backward direction, for a powerline frequency band is calculated as follows:

$$LC_{i \to j}[m] = adpKr * MOD_{Kr} + adpKm * MOD_{Km} +$$

$$adpKc[m] * \frac{\left(\begin{array}{c}MaximumNumberOfTones - \\ NumberOfActiveTones\end{array}\right)}{MaximumNumberOfTones} +$$

$$adpKq * MAX\left(0, MIN\left(1, \frac{adpHighLQIValue - LQI}{adpHighLQIValue - adpLowLQIValue}\right)\right)$$

where MODKr=1 for a robust mode, 0 for other modulations, a modulation according to said robust mode comprising successively a Reed-Solomon coding, a convolutional coding, a code repetition coding and a BPSK modulation;

MOD$_{Km}$ is equal to 3 for Differential Binary Phase Shift Keying (DBPSK) or Binary Phase Shift Keying (BPSK) modulations including said robust mode, is equal to 2 for Differential Quadrature Phase Shift Keying (DQPSK) or Quadrature Phase Shift Keying (QPSK) modulations, is equal to 1 for Eight-Ary Differential Phase-Shift Keying (D8PSK) or Eight-Phase Shift Keying (8-PSK) modulations and 0 for 16-State Quadrature Amplitude Modulation (16-QAM) modulations;

adpKr, adpKm, adpKq are weighting factors;

adpKc[m] is a weighting factor defined per frequency band;

LQI is a value representing a quality of a link in the forward direction between the node i and j;

adpHighLQIValue and adpLowLQIValue are threshold values;

MaximumNumberOfTones is a number of sub-carriers available;

NumberOfActiveTones is a number of active sub-carriers.

5. The method according to claim 1, wherein said link cost $LC_{i \to j}[m]$ in the forward direction, and respectively $LC_{j \to i}[m]$ in the backward direction, for a radio-frequency channel is calculated as follows:

$$LC_{i \to j}[m] =$$

$$adpKq_{RF} * MAX\left(0, MIN\left(1, \frac{adpHighLQIValue_{RF} - LQI_{RF}}{adpHighLQIValue_{RF} - adpLowLQIValue_{RF}}\right)\right) +$$

$$\frac{adpKdc_{RF} * DutyCyclePenalty}{100}$$

where:

adpKq$_{RF}$ et adpKdc$_{RF}$ are weighting factors;

adpHighLQIValue$_{RF}$ and adpLowLQIValue$_{RF}$ are threshold values;

LQI$_{RF}$ is a value representing a quality of a radio-frequency link in the forward direction between the node devices i and j;

DutyCyclePenalty is a value representing a degree of use of the radio frequency link already reached with respect to an authorised maximum.

6. Method according to claim 1, wherein said set of frequency bands comprises:

a Comité Européen de Normalisation Électrotechnique (CENELEC) A frequency band;

a CENELEC B frequency band;

a Federal Communications Commission (FCC) frequency band or an Association of Radio Industries and Businesses (ARIB) frequency band; and a radio frequency (RF) channel of G3-Power Line Communication/Radio Frequency (G3-PLC) Hybrid RF.

7. A node device of a mesh electrical supply network using powerline and/or radio-frequency communications, said node device being able to be reached from another node device of said electrical supply network by at least two different communication routes, said node device comprising:

means for obtaining a route cost (RCk) for each of said communication routes; and means for selecting, from said communication routes, the communication route corresponding to the lowest route cost, wherein, for a given route, the route cost is equal to the sum of the link costs ($LC_{i,j}$) between two successive nodes i and j on said route, said link cost ($LC_{i,j}$) between two successive node devices is equal to a weighted sum between a maximum value from a cost of the link in a forward direction ($LC_{i \to j}$) and a link cost in a backward direction ($LC_{j \to i}$) and a ratio between a number of active routes and a maximum number of active routes of a routing table of the node device j and wherein said link cost $LC_{i \to j}$ in the forward direction, or respectively $LC_{j \to i}$ in the backward direction, is calculated as follows $$LC_{i \to j} = adpKhr * MOD_{Khr} + \frac{\text{Min}_{LC_{i \to j}}}{1 + \sum_{m=0, m \neq m0}^{NBP-1} \left( \frac{\text{Min}_{LC_{i \to j}} * adpKmb}{Lc_{i \to j}[m] * 255} \right)}$$

or as follows:

$$LC_{i \to j} = adpKhr * MOD_{Khr} + \frac{1}{\sum_{m=0}^{NBP-1} \left( \frac{1}{LC_{i \to j}[m]} \right)}$$

where $LC_{i \to j}[m]$ is said link cost in the forward direction for a frequency band of index m;

$MOD_{Khr}$ is equal to 1 for a hyper-robust node, 0 otherwise, said hyper-robust mode being a transmission mode wherein a node device transmits the same message simultaneously on a plurality of frequency bands;

NBP is a number of frequency bands in a set of frequency bands used for the transmission, said set of frequency bands comprising at least two different frequency bands;

$\text{Min}_{LC_{i \to j}} = \min (LC_{i \to j}[m])$ and corresponds to the frequency band of index $m_0$; and adpKhr and adpKmb are weighting factors.

8. A mesh electrical supply network using powerline and/or radio-frequency communications, comprising a node device according to claim 7.

9. A non-transitory storage medium storing instructions for implementing, by a node device, the method according to claim 1, when said instructions are executed by a processor of the node device.

\* \* \* \* \*